(12) United States Patent
Dukes et al.

(10) Patent No.: US 8,038,295 B2
(45) Date of Patent: Oct. 18, 2011

(54) TINTED CONTACT LENSES WITH COMBINED LIMBAL RING AND IRIS PATTERNS

(75) Inventors: Jerry W. Dukes, Jacksonville, FL (US); Angie L. Bowers, Jacksonville, FL (US); Karin D. McCarthy, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 12/627,783

(22) Filed: Nov. 30, 2009

(65) Prior Publication Data

US 2010/0073630 A1    Mar. 25, 2010

Related U.S. Application Data

(62) Division of application No. 10/843,954, filed on May 12, 2004, now Pat. No. 7,641,336.

(51) Int. Cl.
*G02C 7/04* (2006.01)

(52) U.S. Cl. .................................. 351/162; 351/160 R

(58) Field of Classification Search .............. 351/160 R, 351/162
See application file for complete search history.

(56) References Cited

U.S. PATENT DOCUMENTS

| | | | |
|---|---|---|---|
| 2,593,150 A | 4/1952 | Jardon | |
| 5,160,463 A | 11/1992 | Evans et al. | |
| 5,302,978 A | 4/1994 | Evens et al. | |
| 5,793,466 A | 8/1998 | Moncada | |
| 5,936,705 A | 8/1999 | Ocampo et al. | |
| 6,030,078 A | 2/2000 | Ocampo | |
| 6,132,043 A | 10/2000 | Atkins et al. | |
| 6,513,930 B2 | 2/2003 | Hsu | |
| 6,733,127 B2 | 5/2004 | Benskyk | |
| 6,890,075 B2 | 5/2005 | Francis et al. | |
| 7,246,903 B2 | 7/2007 | Bowers et al. | |
| 2002/0060777 A1 | 5/2002 | Chapoy et al. | |
| 2003/0025873 A1 | 2/2003 | Ocampo | |
| 2003/0156249 A1 | 8/2003 | Jahnke | |
| 2004/0119939 A1 | 6/2004 | Clark et al. | |
| 2005/0001978 A1 | 1/2005 | Ocampo | |
| 2008/0278680 A1* | 11/2008 | Ocampo | 351/162 |

FOREIGN PATENT DOCUMENTS

| | | |
|---|---|---|
| EP | 498835 B1 | 8/1992 |
| EP | 0982617 | 1/2000 |
| KR | 300287745 | * 12/2001 |
| WO | WO 91/06886 | 5/1991 |
| WO | WO 99/46630 | 9/1999 |
| WO | WO 0014591 | 3/2000 |

OTHER PUBLICATIONS

PCT International Search Report . PCT/2008/063880 date of mailing Aug. 4, 2008.

* cited by examiner

*Primary Examiner* — Jordan Schwartz
(74) *Attorney, Agent, or Firm* — Todd F. Volyn

(57) ABSTRACT

The invention provides tinted contact lenses that include a limbal ring that serves to enhance the definition of the wearer's iris resulting in the iris appearing larger to viewer's of the lens wearer. The lens also incorporates additional elements that overlie a portion of the wearer's iris. The lenses of the invention may be used as cosmetic lenses for enhancing or altering an individual's iris.

1 Claim, 9 Drawing Sheets

TINTED CONTACT LENSES WITH COMBINED LIMBAL RING AND IRIS PATTERNS

CROSS REFERENCE TO RELATED APPLICATION

This application is a divisional application of U.S. application Ser. No. 10/843,954 filed on May 12, 2004 now U.S. Pat. No. 7,641,336 and claims priority thereto under 35 U.S.C. 121.

FIELD OF THE INVENTION

The invention relates to tinted contact lenses. In particular, the invention provides contact lenses that either enhance or change the color of a lens wearer's iris.

BACKGROUND OF THE INVENTION

The use of tinted, or colored, contact lenses to either or both alter the natural color of the iris and to mask ophthalmic abnormalities is well known. Typically, these lenses use either or both opaque and translucent colors to change the color of an iris, as for example, from brown to blue. Additionally, tinted lenses have been manufactured that attempt to enhance the color of a dark-eyed person without changing the color of the iris. These lenses are disadvantageous because either the color enhancement is too subtle to be noticed when the lens is on-eye or the enhancement lends an unnatural appearance to the wearer's iris. Therefore, a need exists for lenses that enhance the color of a dark eye that overcomes these disadvantages.

DETAILED DESCRIPTION OF THE INVENTION AND PREFERRED EMBODIMENTS

The invention provides tinted contact lenses, and methods for their manufacture, that enhance the lens wearer's iris. The lenses of the invention have a pattern that includes a limbal ring that serves to enhance the definition of the wearer's iris resulting in the iris appearing larger to viewer's of the lens wearer. Additionally, the lenses of the invention have additional pattern elements that partially overlie the wearer's iris. The lenses of the invention may find greatest utility as cosmetic lenses for enhancing a dark-eyed individual's iris, but also may be used to enhance the iris of a light-eyed lens wearer as well.

In one embodiment, the invention provides a contact lens comprising, consisting essentially of, and consisting of a limbal ring and a fibrous dot pattern.

By "limbal ring" is meant an annular band of color that, when the lens is on-eye and centered, partially or substantially completely overlies the lens wearer's limbal region, or the junction of the sclera with the cornea. Preferably, the limbal ring substantially completely overlies the limbal region. The innermost border, or edge closest to the geometric center of the lens, of the limbal ring may be at a diameter of about 8 mm to about 12 mm, preferably about 9 to about 11 mm, from the lens' geometric center. The ring may be of any suitable width and preferably is about 0.5 to about 2.5 mm in width, more preferably about 0.75 to about 1.25 mm in width.

Adjacent to the limbal ring's innermost edge is a fibrous dot pattern. By "fibrous dot pattern" is meant a pattern of dots that are arranged such that they appear to form a plurality of fibrous structures in which each of the individual fibrous structures may or may not be intertwined with other of the fibrous structures. The dot pattern used in the lenses of the invention does not extend over the entire iris portion of the lens, meaning the portion of the lens that overlies the iris when the lens is on-eye and centered. Rather, the dot pattern extends inwardly from the innermost edge of the limbal ring so that the innermost border, or edge relative to the geometric center of the lens, of the fibrous dot pattern is located at about 6.5 mm or greater, preferably about 7 mm or greater from the geometric center of the lens. The dots used in the pattern may be of any size and preferably are about 0.060 to about 0.180 mm in diameter, more preferably about 0.0075 to about 0.0125 mm in diameter.

Figure 1:
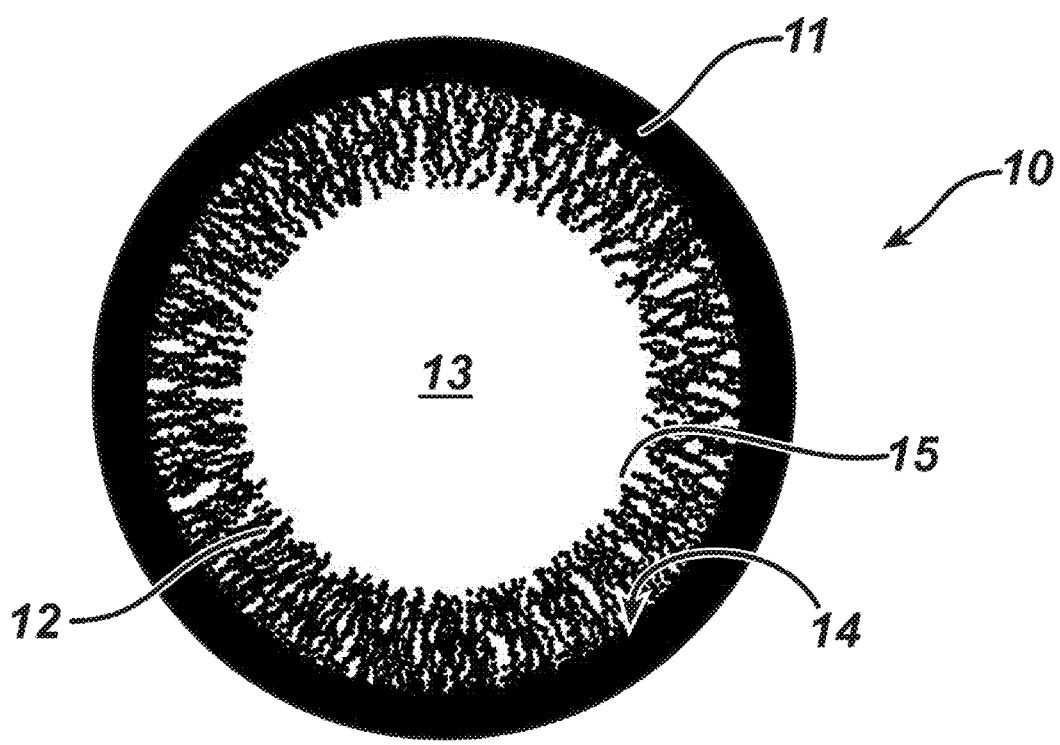
FIG. 1 is a scanned image of one embodiment of the invention.

In FIG. 1 is shown limbal ring-fibrous dot pattern 10. In this embodiment, limbal ring 11 is a black opaque band that is approximately 1 mm in width. Beginning at the innermost border 14 of limbal ring 11 and extending inwardly towards the geometric center of the lens is fibrous dot pattern 12 composed of a plurality of substantially intertwined fibrous structures. Preferably, the fibrous structures are random, meaning that no repeating clusters of fibrous structures are included in the fibrous dot pattern. The innermost border 15 of fibrous dot pattern 12 lies at a diameter of 7 mm from the geometric center of the lens. Innermost borders 14 and 15 as shown are even, regular borders, but either or both may have an uneven, irregularly shape. Also shown is area 13, a region in which there are no pattern elements. Area 13 will overlie part of the iris portion as well as the whole of the pupil portion, which pupil portion will overlie the wearer's pupil, when the lens is on-eye and centered. As shown and preferably, area 13 is clear. However area 13 may be an area of translucent or opaque color or any combination of opaque and translucent colors.

Figure 2:
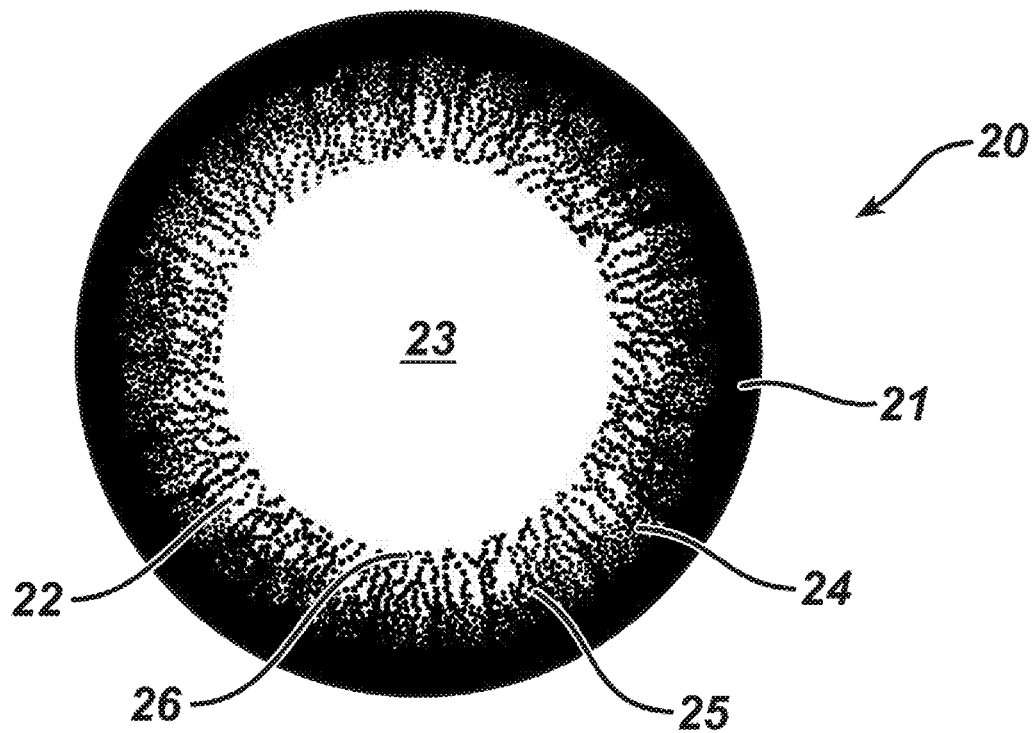
FIG. 2 is a scanned image of a second embodiment of the invention.
Figure 3:
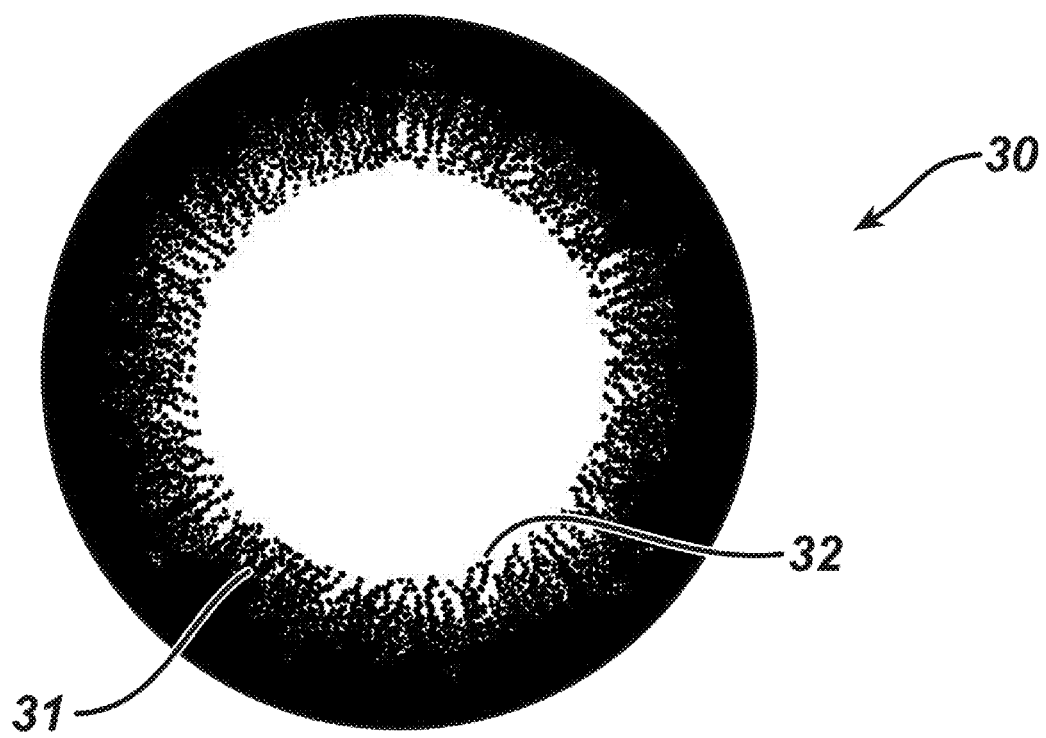
FIG. 3 is a scanned image of a third embodiment of the invention.
Figure 4:
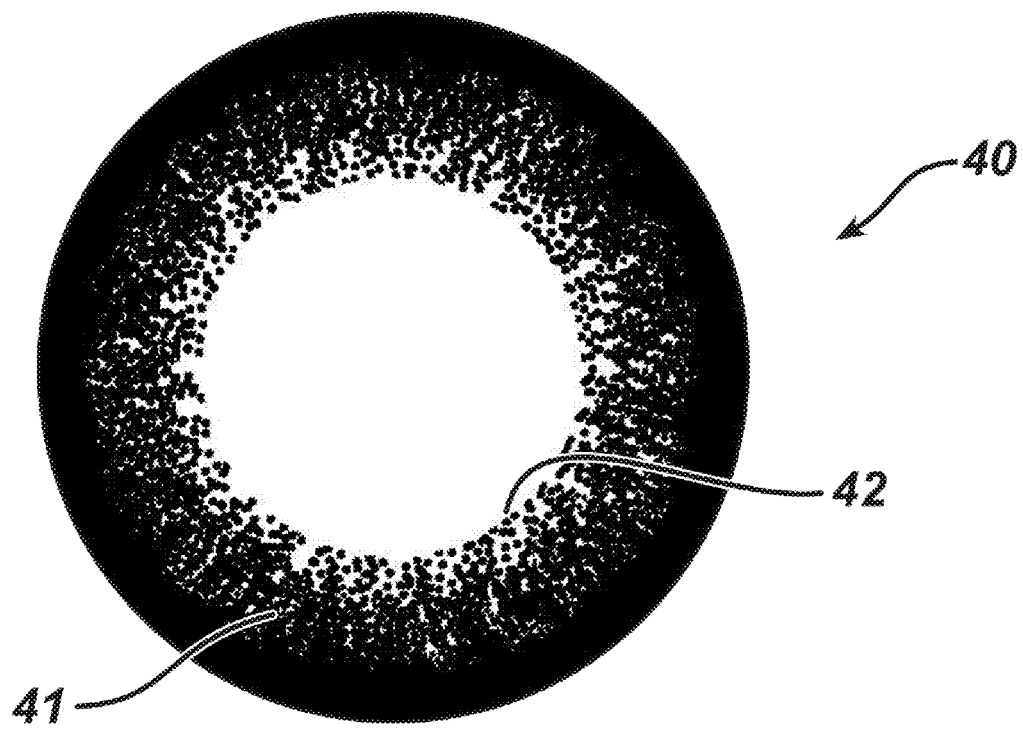
FIG. 4 is a scanned image of a fourth embodiment of the invention.

FIG. 2 depicts another embodiment, pattern 20. Pattern 20 includes fibrous dot pattern 22 that begins at the innermost edge 24 of limbal ring 21. An area 25 also is included in which area a plurality of randomly placed dots overlay a part of fibrous dot pattern 22. Area 25 provides a blending of the border between limbal ring 21 and fibrous dot pattern 22 and may be of any width. Preferably, area 25 is of a width such that it extends over or overlies about 1 to about 90%, preferably about 5 to about 50%, more preferably about 5 to about 25% of the fibrous dot pattern. As shown, area 25 overlies about 25 percent of fibrous dot pattern 22. Innermost border 26 of the fibrous dot pattern ends at a diameter that is 7 mm from the lens' geometric center and borders area 23 in which there are no pattern elements. FIG. 3 depicts yet another embodiment, dot pattern 30 in which there is random dot overlay 31 of the border between the limbal ring and fibrous dot pattern. In this embodiment, the random dots are more numerous and extend further inwardly toward innermost border 32 of the fibrous dot pattern. As shown, random dot overlay 31 overlies about 64 percent of fibrous dot pattern. FIG. 4 is a fourth and preferred embodiment of the limbal ring-fibrous dot pattern. Pattern 42 contains random dot overlay 41. The innermost border 42 of the fibrous dot pattern is about 6.5 mm from the lens' geometric center. As shown, random dot overlay 41 overlies about 90% percent of fibrous dot pattern. Alternatively, the random dot pattern may be such that, as one moves inwardly toward the lens' geometric center, the dots become less numerous forming a dot density gradient.

In another embodiment, the invention provides a contact lens comprising, consisting essentially of, and consisting of a limbal ring and a spoke dot pattern.

By "spoke dot pattern" is meant a pattern of dots in which clusters of dots are arranged in arrays such that each dot cluster appears to form a structure that extends inwardly toward the geometric center of the lens and that substantially resembles a spoke in a wheel. The spoke dot pattern of the invention does not extend over the entire iris portion of the lens, but rather extends inwardly from the innermost edge of the limbal ring so that the innermost edge of the spoke pattern is located at about 6.5 mm or greater, preferably about 7 mm or greater from the geometric center of the lens. The dots may be of any size and preferably are about 0.060 to about 0.180 mm in diameter, more preferably about 0.075 to about 0.125 mm in diameter. The dimensions and location of the limbal ring may be the same as for the limbal ring-fibrous dot patterns.

Figure 5:
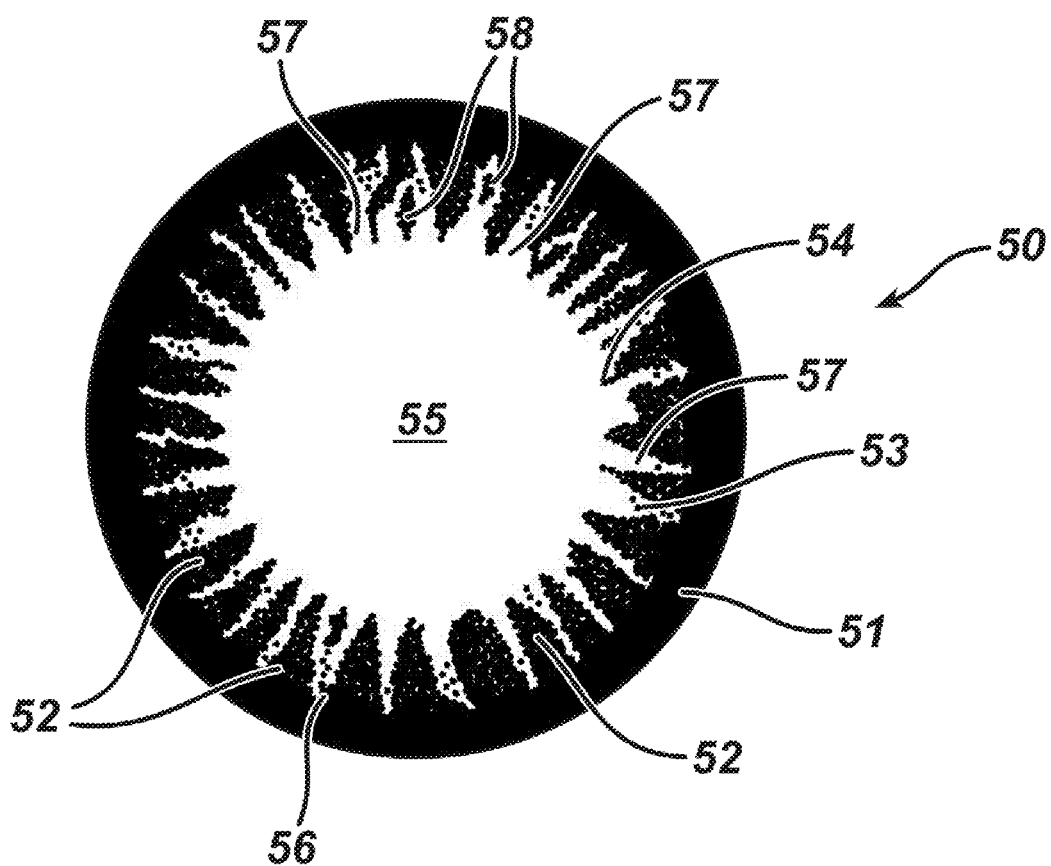
FIG. 5 is a scanned image of a fifth embodiment of the invention.

In FIG. 5 is shown a preferred spoke-dot pattern 50. In this embodiment, limbal ring 51 is a black opaque band that is approximately 1 mm in width. Beginning at the innermost border 56 of limbal ring 51 and extending inwardly towards the geometric center of the lens are multiple spokes 52, the innermost border 54 of which lies at a diameter of 7 mm from the geometric center of the lens. Although all of the spokes are generally similarly configured, preferably no one of the spokes is exactly the same as another of the spokes. The spokes are interspersed, or bordered, by spaces 57 in which spaces there are no elements or as shown, and preferably, a few isolated dots 53 or isolated dots along with dot clusters 58 are included. Spaces 57 are also generally all similarly configured, but preferably no one of the spaces is of the exact same configuration as any of the other of the spaces or spokes. Area 55 is a region in which there are no pattern elements, which area will partially overlie the iris portion as well as the whole of the pupil portion. As shown, area 55 is clear, but it may be colored as well. Innermost borders 56 as shown is of an uneven, irregularly shape, but may be an even border. Similarly, although spoke border 54 forms a substantially even border, it may form an uneven border.

Figure 6:
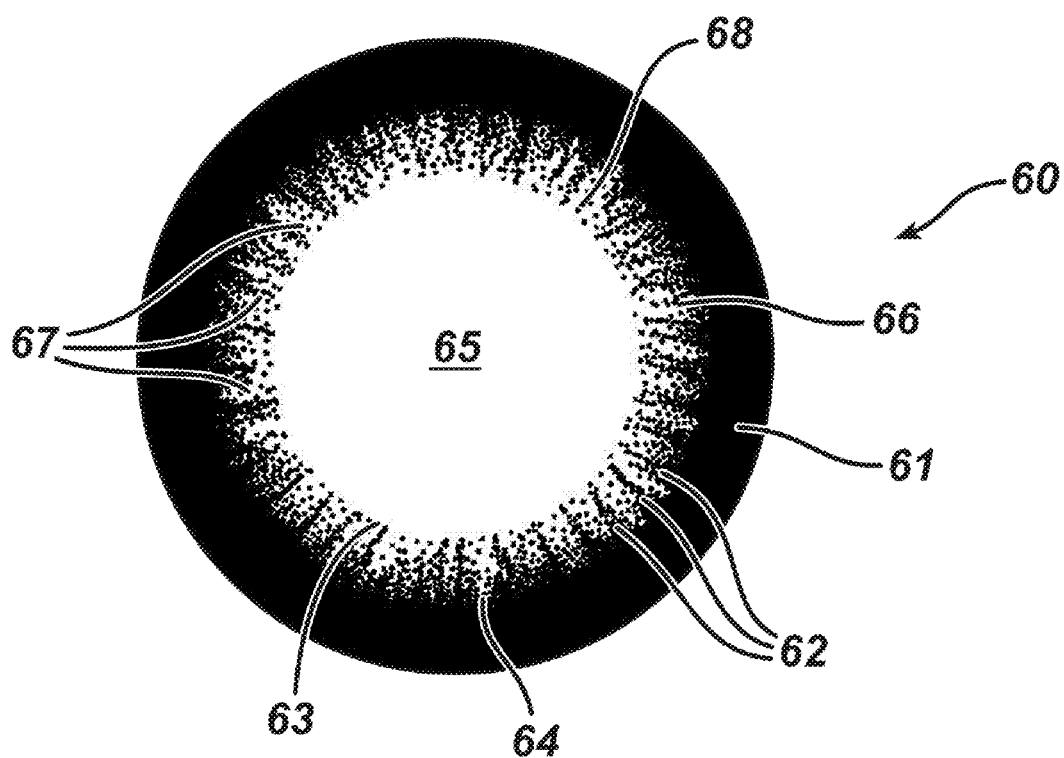
FIG. 6 is a scanned image of a sixth embodiment of the invention.

In FIG. 6 is shown an alternative pattern 60. In this embodiment, beginning at the innermost border 64 of limbal ring 61 and extending inwardly towards the geometric center of the lens is a spoke dot pattern with multiple spokes 62, the innermost boundary 63 of which lies at a diameter of 7 mm from the geometric center of the lens. An area 66 is included in which multiple, random dots overlay the innermost portion of the spokes 62 to provide a blending of the border between limbal ring 61 and the spokes. The overlay may be of the same coverage as in the fibrous dot patterns and as shown, overlies about 30% of the spoke dot pattern. The spokes 62 are bordered by spaces 67 in which spaces there are no elements or, as shown and preferably, a few isolated dots 68, are included. Area 65 is a region in which there are no pattern elements, which area will partially overlie the iris portion as well as the pupil portion.

Figure 7:
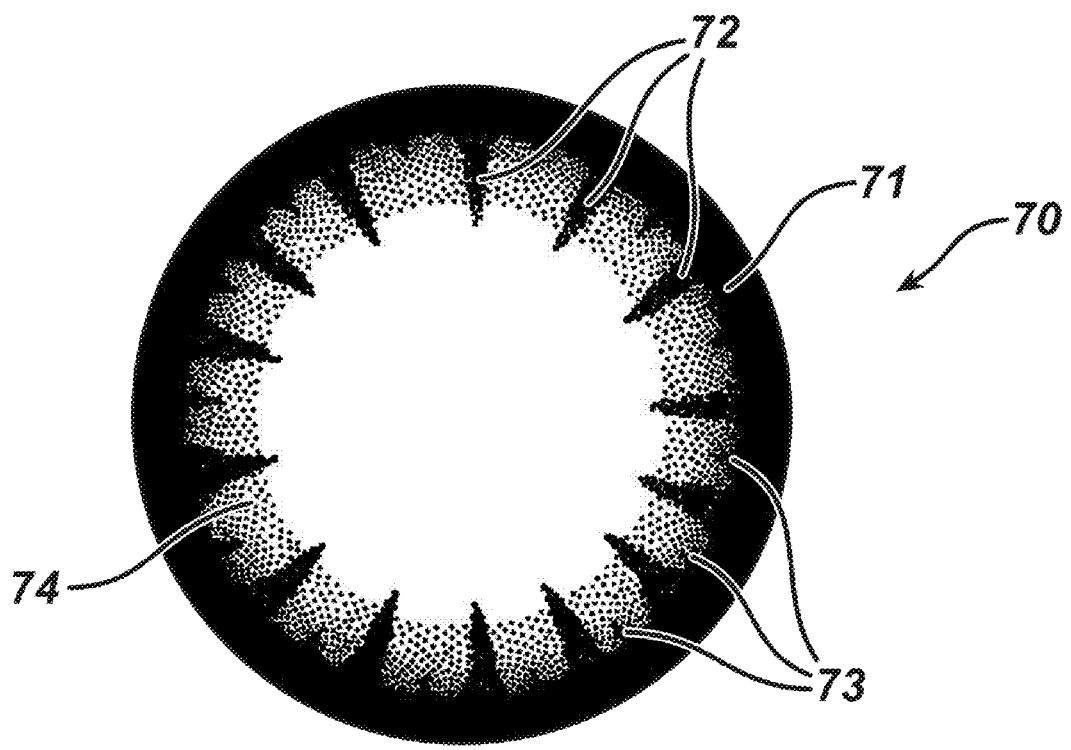
FIG. 7 is a scanned image of a seventh embodiment of the invention.

In FIG. 7 is shown yet another alternative pattern 70. In this embodiment, the spoke dot pattern has multiple spokes 72 and 73, spokes 72 being longer than spokes 73 and both of which spokes are formed by densely packed dots. As shown, spokes 72 and 73 are spaced at regular intervals from one another, but may be irregularly spaced as well. Additionally, each of spokes 72 and are all of the substantially same shape, but they may be of differing shapes as may the case for spokes 73. An annular area 74 is included in which multiple dots overlay spokes 73 and 72. The dots in area 74 become less numerous as one moves inwardly toward the geometric center of the lens forming a dot density gradient. Area 74 provides a blending of the border between limbal ring 71 and spokes 72 and 73 and overlies about 90% of the spoke dot pattern.

Figure 8:
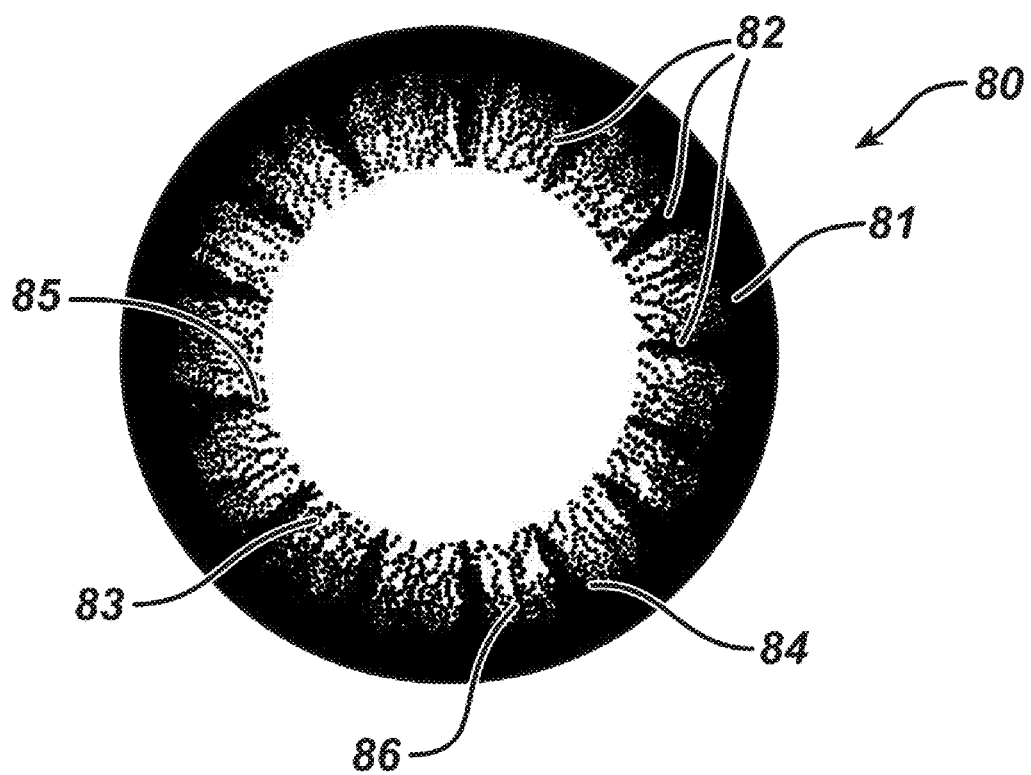
FIG. 8 is a scanned image of an eighth embodiment of the invention.
Figure 9:
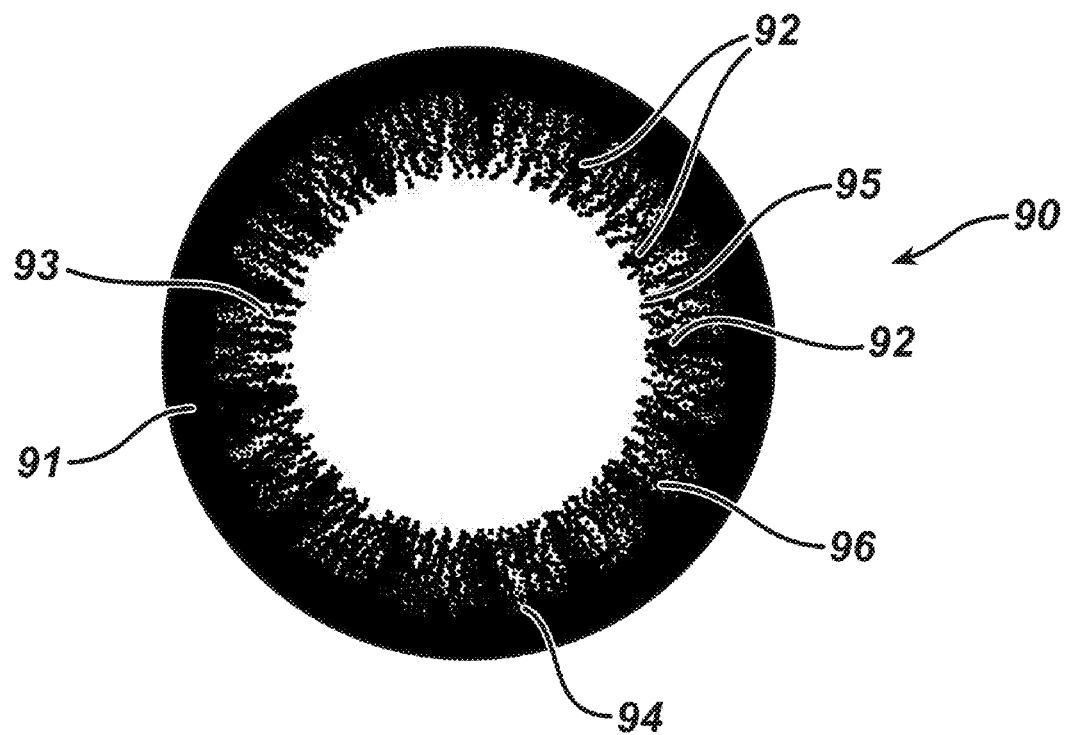
FIG. 9 is a scanned image of a ninth embodiment of the invention.

In yet another embodiment, the invention provides a lens comprising, consisting essentially of, and consisting of a limbal ring, a fibrous dot pattern, and a spoke dot pattern. In FIGS. 8 and 9 are shown patterns 80 and 90, respectively. In each of these embodiments, the spoke dot pattern has multiple spokes 82 and 92, respectively, formed by densely packed dots. As shown, the spokes are spaced at regular intervals from one another, but may be irregularly spaced as well. Beginning at the innermost borders 84 and 94 of limbal ring 81 and 91, respectively, and extending inwardly towards the geometric center of the lens are fibrous dot patterns 83 and 93, the innermost boundaries 85 and 95 of which each lie at a diameter of about 7 mm from the geometric center of the lens. An area 86 and 96 is included in each of FIGS. 8 and 9, respectively, which are areas of multiple dots that overlay about 46% of spokes 82 and 92 and fibrous dot patterns 83 and 93 to provide a blending of the border between limbal rings, spokes and fibrous dot pattern.

As used in a lens for either enhancing or altering the wearer's eye color, preferably the limbal ring element is a solid band of color that masks the color of the lens wearer's limbal region and more preferably the masking color is an opaque color. The remaining elements, the dots which make up the fibrous and spoke patterns, random dots, dot clusters, and gradient may be translucent or opaque depending on the desired on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T.

The color of the limbal ring may be substantially the same as, or complementary to, the color selected for the remaining elements. Preferably, all elements are of the same color. The color selected for each of the limbal ring and remaining pattern elements will be determined by the natural color of the lens wearer's iris and the enhancement or color change desired. Thus, elements may be any color including, without limitation, any of a variety of hues and chromas of blue, green, gray, brown, black yellow, red, or combinations thereof. Preferred colors for the limbal ring include, without limitation, any of the various hues and chromas of black, brown and gray.

The elements, may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include, without limitation, phthalocyanine blue, phthalocyanine green, carbazole violet, vat orange # 1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

The elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. A colorant containing a binding polymer, solvent, and pigment or dye is then deposited onto the elements to fill the depressions with colorant. A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays at least the limbal ring and dot patterns and preferably forms the entirety of the lens' outermost surface. The pre-polymer may be any polymer that is capable of dispersing the pigment and any opacifying agent used.

The invention may be used to provide tinted hard or soft contact lenses made of any known lens-forming material, or material suitable for manufacturing such lenses. Preferably, the lenses of the invention are soft contact lenses the material selected for forming the lenses of the invention being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, made of monomers containing hydroxy groups, carboxyl groups, or both or be made from silicone-containing polymers, such as siloxanes, hydrogels, silicone hydrogels, and combinations thereof. Materials for making soft contact lenses are well known and commercially available. Preferably, the material is acquafilcon, etafilcon, genfilcon, lenefilcon, balafilcon, lotrafilcon, or galyfilcon.

What is claimed is:

1. A contact lens, comprising a limbal ring, a fibrous dot pattern, and a spoke dot pattern; wherein said limbal ring comprises an opaque band, said spokes are in contact with said ring, and extend from the limbal ring inwardly towards the center of the lens, wherein the innermost border of all spokes of said contact lens lie no closer to the geometric center of the lens than 7 mm, and wherein said contact lens is a finished contact lens.

* * * * *